United States Patent
Lisseman et al.

(12) 
(10) Patent No.: US 11,590,889 B2
(45) Date of Patent: Feb. 28, 2023

(54) FORCE SENSING HORN SYSTEM

(71) Applicant: JOYSON SAFETY SYSTEMS ACQUISITION LLC, Auburn Hills, MI (US)

(72) Inventors: Jason Carl Lisseman, Shelby Township, MI (US); Erick Paul Staszak, Rochester Hills, MI (US); David William Andrews, Ortonville, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 326 days.

(21) Appl. No.: 16/915,277

(22) Filed: Jun. 29, 2020

(65) Prior Publication Data

US 2021/0046866 A1    Feb. 18, 2021

Related U.S. Application Data

(63) Continuation of application No. 15/368,101, filed on Dec. 2, 2016, now Pat. No. 10,696,221.

(Continued)

(51) Int. Cl.
*B60R 21/16* (2006.01)
*B60Q 5/00* (2006.01)
(Continued)

(52) U.S. Cl.
CPC ............. *B60Q 5/003* (2013.01); *B60Q 5/001* (2013.01); *B60Q 9/00* (2013.01); *B60R 21/2037* (2013.01); *B60R 21/21658* (2013.01)

(58) Field of Classification Search
CPC .......... B60Q 5/003; B60Q 5/001; B60Q 9/00; B60R 21/2037; B60R 21/21658
See application file for complete search history.

(56) References Cited

U.S. PATENT DOCUMENTS

| | | |
|---|---|---|
| 5,398,962 A | 3/1995 | Kropp et al. |
| 5,563,354 A | 10/1996 | Kropp et al. |

(Continued)

FOREIGN PATENT DOCUMENTS

| | | |
|---|---|---|
| CN | 1743207 A | 3/2006 |
| CN | 102186703 A | 9/2011 |

(Continued)

OTHER PUBLICATIONS

Chinese office action in Application No. 201680077940.8. dated Sep. 7, 2021. 7 pages.

(Continued)

*Primary Examiner* — An T Nguyen
(74) *Attorney, Agent, or Firm* — Meunier Carlin & Curfman LLC

(57) ABSTRACT

Various implementations of a horn system include one or more force sensors disposed on a first portion of a driver air bag module and one or more actuators disposed on a second portion of the driver air bag module. For example, the force sensors may be disposed adjacent a perimeter of a base plate of the driver air bag module, and the actuators may extend inwardly toward the force sensors from an inner surface of a cover of the driver air bag module, or vice versa. To actuate the horn, the cover is moved axially toward the base plate, causing the actuators to apply force to the force sensors. Force signals received from the force sensors are used by one or more processors to determine characteristics of the force received and/or select a control message for communicating to the horn system based on the force signal characteristics.

20 Claims, 13 Drawing Sheets

Related U.S. Application Data

(60) Provisional application No. 62/263,092, filed on Dec. 4, 2015.

(51) Int. Cl.
  *B60Q 9/00* (2006.01)
  *B60R 21/203* (2006.01)
  *B60R 21/2165* (2011.01)

(56) References Cited

U.S. PATENT DOCUMENTS

| | | |
|---|---|---|
| 5,772,239 A | 6/1998 | Seymour |
| 5,942,815 A | 8/1999 | Neuman et al. |
| 5,961,144 A | 10/1999 | Desmarais |
| 5,965,952 A | 10/1999 | Podoloff et al. |
| 6,193,267 B1 | 2/2001 | Tichvon et al. |
| 6,236,309 B1 | 5/2001 | Haag et al. |
| 6,918,610 B2 | 6/2005 | Song et al. |
| 7,464,959 B2 | 12/2008 | Pillsbury, IV et al. |
| 8,169,305 B2 | 5/2012 | Matsumoto et al. |
| 8,382,152 B2 | 2/2013 | Radde et al. |
| 8,556,292 B2 | 10/2013 | Umemura et al. |
| 8,581,126 B1 | 11/2013 | Cannella et al. |
| 8,794,662 B2 | 8/2014 | Ishii et al. |
| 8,983,732 B2 | 3/2015 | Bosch et al. |
| 9,156,400 B2 | 10/2015 | Ishii et al. |
| 9,550,525 B2 | 1/2017 | Ishii et al. |
| 2004/0090052 A1* | 5/2004 | Sugimoto .............. B60Q 5/003 280/731 |
| 2005/0062269 A1* | 3/2005 | Amamori ............ B60R 21/2035 280/731 |
| 2006/0025897 A1 | 2/2006 | Shostak et al. |
| 2006/0109256 A1 | 5/2006 | Grant et al. |
| 2006/0284839 A1 | 12/2006 | Breed et al. |
| 2007/0132218 A1 | 6/2007 | Kim et al. |
| 2009/0261560 A1 | 10/2009 | Nakagawa et al. |
| 2011/0241850 A1 | 10/2011 | Bosch et al. |
| 2013/0015645 A1 | 1/2013 | Ullrey et al. |
| 2014/0125124 A1 | 5/2014 | Verner |
| 2014/0224018 A1 | 8/2014 | Whitesides et al. |
| 2015/0042079 A1 | 2/2015 | Ishii et al. |
| 2017/0072985 A1 | 3/2017 | Ishii et al. |
| 2017/0158126 A1 | 6/2017 | Lisseman et al. |
| 2017/0178846 A1 | 6/2017 | Raikar et al. |
| 2018/0029556 A1 | 2/2018 | Ishii et al. |
| 2019/0161004 A1 | 5/2019 | Park et al. |
| 2019/0389374 A1 | 12/2019 | Thompson |
| 2020/0043679 A1 | 2/2020 | Nonoyama et al. |

FOREIGN PATENT DOCUMENTS

| | | |
|---|---|---|
| CN | 103029741 A | 4/2013 |
| CN | 103338978 A | 10/2013 |
| CN | 103366999 A | 10/2013 |
| CN | 111132874 A | 5/2020 |
| EP | 1348595 A2 | 1/2003 |
| EP | 1348595 A2 | 10/2003 |
| EP | 2544920 B9 | 11/2014 |
| JP | H061196 A | 1/1994 |
| JP | H10203375 A | 8/1998 |
| KR | 970037891 A | 7/1997 |
| KR | 20080093632 A | 10/2008 |
| WO | 2016096564 A1 | 6/2016 |
| WO | 2018166974 A1 | 9/2018 |
| WO | 2019063371 A1 | 4/2019 |

OTHER PUBLICATIONS

Advisory Action Before the Filing of an Appeal Brief in connection to U.S. Appl. No. 16/839,760, dated Mar. 8, 2022, 3 pages.
Non-Final Office Action in connection to U.S. Appl. No. 16/910,828, dated Mar. 30, 2022, 35 pages.
Advisory Action Before the Filing of an Appeal Brief in connection to U.S. Appl. No. 16/839,760, dated Apr. 4, 2022, 3 pages.
Office Action in connection to U.S. Appl. No. 16/839,760, dated Dec. 27, 2021.
International Search Report and Written Opinion PCT/2016/064774, dated Feb. 16, 2017.
Office Action issued for Chinese Application No. 201680077940, dated Jan. 25, 2021.
Office Action issued for U.S. Appl. No. 16/839,760, dated Jun. 15, 2021.
Office Action issued for U.S. Appl. No. 16/839,760, dated May 14, 2021.
Notice of Allowance in connection to U.S. Appl. No. 16/839,760, dated Jul. 11, 2022.
Notice of Allowance in connection to U.S. Appl. No. 16/910,828, dated Aug. 8, 2022.

\* cited by examiner

FORCE SENSING HORN SYSTEM

CROSS REFERENCE TO RELATED APPLICATION

This application is a continuation application of U.S. application Ser. No. 15/368,101 filed Dec. 2, 2016, which will issue as U.S. Pat. No. 10,696,221 on Jun. 30, 2020, which claims priority to U.S. Provisional Application No. 62/263,092, entitled "Force Sensing Horn System," filed Dec. 4, 2015, the contents of both are herein fully incorporated by reference in their entireties.

BACKGROUND

Horn switches may be integrated into a driver air bag module within a vehicle. For example, the driver air bag module may be secured onto a frame of a hub of a steering wheel in the vehicle. The driver air bag module may include an electrical contact that completes an electrical circuit of a horn system when the air bag module is moved toward a corresponding electrical contact on the steering wheel frame. Typically, the contact on the driver air bag module is biased away from the contact on the steering wheel frame using springs, and the vehicle operator must push the driver air bag module with sufficient force to overcome the biasing force of the springs. The horn signal produced by completing the circuit is an on/off signal. In addition, depending on the location and number of the contacts, the force required to actuate the horn in the center of the driver air bag module may be higher than the force required to actuate the horn from the periphery of the driver air bag module. Furthermore, the horn may be actuated advertently if the vehicle is subjected to vibration, such as off road conditions.

Thus, there is a need in the art for an improved horn system.

BRIEF SUMMARY

Various implementations are directed to an improved horn system for use in a vehicle. The horn system includes one or more force sensors disposed on a first portion of a driver air bag module and one or more actuators disposed on a second portion of a driver air bag module. For example, the force sensors may be disposed adjacent a perimeter of a base plate of a driver air bag module, such as peripheral to a driver air bag and inflator disposed on a central portion of the base plate, and the actuators may extend inwardly toward the force sensors from an inner surface of a cover of the driver air bag module, or vice versa. To actuate the horn, the cover is moved axially toward the base plate, causing the actuators to apply force to the corresponding force sensors. Force signals received from the force sensors are used by one or more processors to determine characteristics of the force received and/or select a control message for communicating to the horn system based on the force signal characteristics. The force signals may also be used to monitor vibration of the vehicle, the steering wheel, and/or the driver air bag module. Furthermore, various horn profiles may be set based on expected force signals, the number and spatial arrangement of force sensors within the driver air bag module, and expected and/or current vehicle conditions. In addition, tactile feedback profiles may be configured to correspond to the force magnitude, location, and/or duration of the force signals.

In various implementations, a vehicle horn actuation system includes a driver air bag module, at least one force sensor, an actuator, and a processor. The driver air bag module includes a first portion and a second portion, wherein a driver air bag and inflator are disposed centrally on the first portion, the first portion is statically coupled to a steering interface of a vehicle, and the second portion is axially translatable relative to the first portion. The at least one force sensor is disposed on one of the first or the second portion, and the force sensor is disposed peripherally of the driver air bag and inflator. The actuator is disposed on the other of the second or first portion, and the actuator and the force sensor are axially aligned such that the actuator moves axially toward the force sensor in response to an axial force being applied to the second portion. The processor is in communication with a memory, and the processor executes computer-readable instructions stored on the memory. The instructions cause the processor to: (1) receive a force signal from the force sensor; and (2) select a control message to communicate to a horn system, wherein the control message is selected from a plurality of control messages depending upon the force signal.

In other various implementations, a vehicle horn actuation system includes a driver air bag module, at least one force sensor, an actuator, and a processor. The driver air bag module includes a first portion and a second portion, wherein a driver air bag and inflator are disposed centrally on the first portion, the first portion is statically coupled to the steering interface of the vehicle, and the second portion is axially translatable relative to the first portion. The at least one force sensor is disposed on one of the first or the second portion, and the force sensor is disposed peripherally of the driver air bag and inflator. The actuator is disposed on the other of the second or first portion, and the actuator and the force sensor are axially aligned such that the actuator moves axially toward the force sensor in response to an axial force being applied to the second portion. The processor is in communication with a memory, wherein the processor executes computer-readable instructions stored on the memory, and the instructions cause the processor to: receive a frequency of the force signal from the force sensor during a lookback period; compare the received frequency of the force signal with a threshold frequency; in response to the received frequency being higher than the threshold frequency, generating a second threshold by adding a force magnitude associated with force signal during the lookback period to a first force magnitude threshold, and select a control message for communicating to a horn system in response to the force magnitude associated with the force signal received after the lookback period being greater than the second force magnitude threshold, the control message being selected from a plurality of control messages.

Other various implementations includes a vehicle horn actuation system that includes a driver air bag module, two or more force sensors, at least one actuator, and a processor. The driver air bag module includes a first portion and a second portion, wherein a driver air bag and inflator are disposed centrally on the first portion, the first portion is statically coupled to the steering interface of the vehicle, and the second portion is axially translatable relative to the first portion. The two or more force sensors are disposed on one of the first or the second portion, and the force sensors are disposed peripherally of the driver air bag and inflator and are spaced apart from each other. The at least one actuator is disposed on the other of the second or first portion, and the at least one actuator and the force sensors are axially aligned such that the at least one actuator moves axially toward the force sensors in response to an axial force being applied to the second portion. The processor is in communication with a memory, wherein the processor executes computer readable instructions stored on the memory, said instructions cause the processor to: identify a location of the axial force on the second portion based on the received force signals from each force sensor; compare a threshold force profile associated with the identified location with the force signals from each force sensor; and generating a control message for communicating to a horn system in response to the force signals corresponding to the threshold force profile associated with the identified location.

The details of one or more implementations of the invention are set forth in the accompanying drawings and the description below. Other features, objects, and advantages of the invention will be apparent from the description and drawings, and from the claims.

BRIEF DESCRIPTION OF THE DRAWINGS

Various implementations of the system are explained in even greater detail in the following exemplary drawings. The drawings are merely exemplary to illustrate the structure of the system and certain features that may be used singularly or in combination with other features. The invention should not be limited to the implementations shown.

FIG. 5 is a partial side view of a portion of the assembled driver air bag module shown in

FIG. 2.

DETAILED DESCRIPTION

Various implementations are directed to an improved horn system for use in a vehicle. The horn system includes one or more force sensors disposed on a first portion of a driver air bag module and one or more actuators disposed on a second portion of a driver air bag module. For example, the force sensors may be disposed adjacent a perimeter of a base plate of a driver air bag module, such as peripheral to a driver air bag and inflator disposed on a central portion of the base plate, and the actuators may extend inwardly toward the force sensors from an inner surface of a cover of the driver air bag module, or vice versa. To actuate the horn, the cover is moved axially toward the base plate, causing the actuators to apply force to the corresponding force sensors. Force signals received from the force sensors are used by one or more processors to determine characteristics of the force received and/or select a control message for communicating to the horn system based on the force signal characteristics. The force signals may also be used to monitor vibration of the vehicle, the steering wheel, and/or the driver air bag module. Furthermore, various horn profiles may be set based on expected force signals, the number and spatial arrangement of force sensors within the driver air bag module, and expected and/or current vehicle conditions. In addition, tactile and/or audible feedback profiles may be configured to correspond to the force magnitude, location, and/or duration of the force signals.

Certain implementations of the horn system in which only the cover is axially translatable to actuate the horn system provide for a lower sprung mass. In addition, in some implementations, the horn system requires less displacement to actuate the horn system as compared with current systems. This feature may allow the cover to be disposed closer to the base plate of the driver air bag module and reduces and/or eliminates the visible gap between the steering interface (e.g., steering wheel) and the cover of the driver air bag module. In some implementations in which the edges of the cover are spaced apart from a steering wheel hub after installation such that a gap there between is visible, a compressible material (e.g., an elastomeric material) may be disposed within the gap. This compressible material allows the cover to move through the gap when the air bag module is coupled to the hub but hides the gap after installation.

Figure 1:
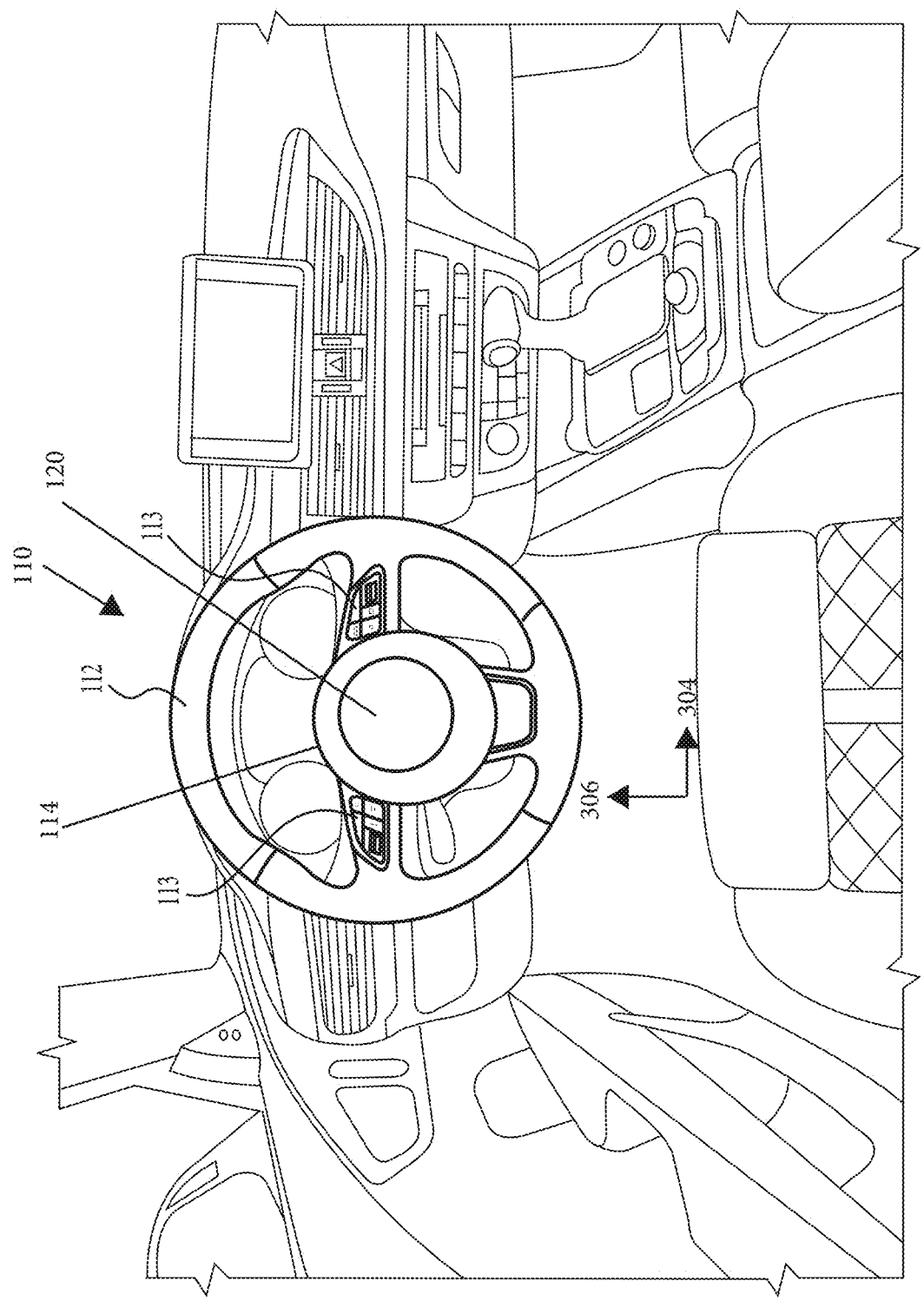
FIG. 1 is a partial view of an exemplary steering apparatus.

As background, FIG. 1 illustrates a plan view of an exemplary steering interface implementing an improved horn system with a driver air bag module. The steering interface 110 includes a steering grip 112, spokes 113, and a hub 114. The steering grip 112 can be shaped in such a way to facilitate a driver's control of a vehicle when holding the steering grip 112. For example, the steering grip 112 shown in FIG. 1 has an annular ring shape with an outer contour that is essentially circular in shape. However, in other implementations, the steering grip can define any suitable shape including, for example, circular, elliptical, square, rectangular, or any other regular or irregular shape. Furthermore, in other implementations, the steering grip can include a single continuous grip portion or any number of unique grip sections.

The steering grip 112 can be coupled to the hub 114 via spokes 113, and the hub 114 can be mounted on a fixed component of the vehicle such that the steering grip 112, spokes 113, and hub 114 can be rotationally moved about a steering axis. An exemplary fixed component can include, for example, a steering column, which receives a steering spindle that extends along the steering column and serves to transmit the rotational movement of the steering grip 112 to the wheels of the motor vehicle. Rotational movement of the steering grip 112 may be transmitted to the wheels by mechanical and/or electrical means.

Figure 2:
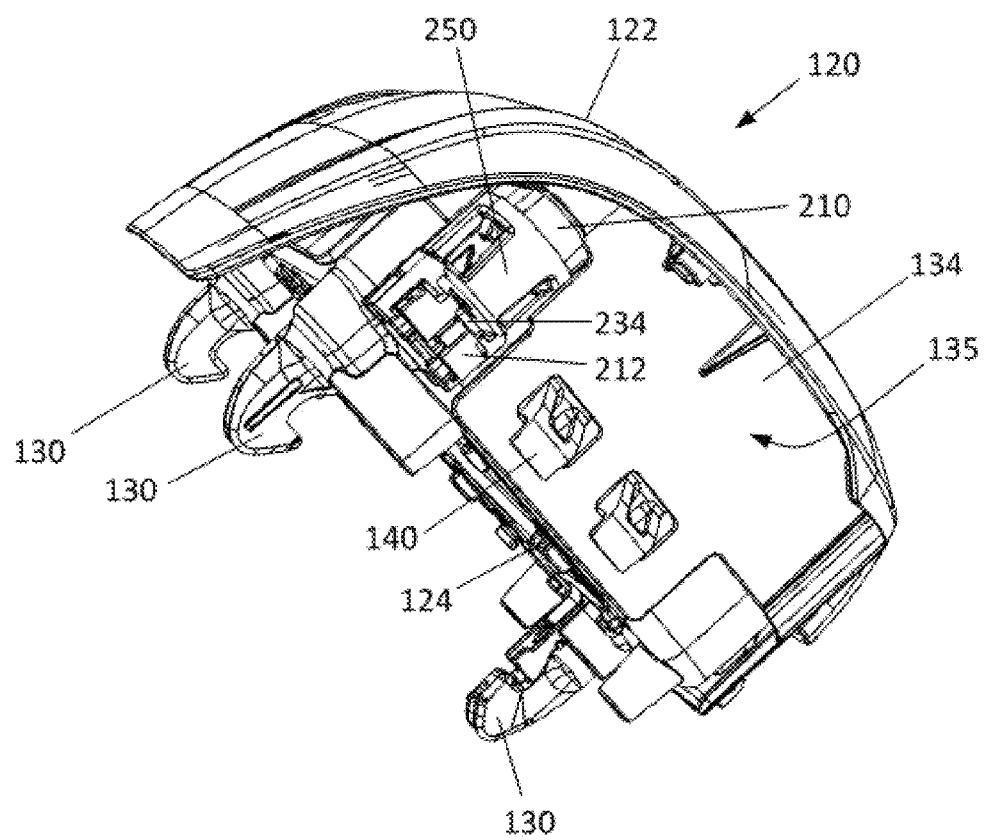
FIG. 2 is a side perspective view of an assembled driver air bag module according to one implementation.
Figure 3:
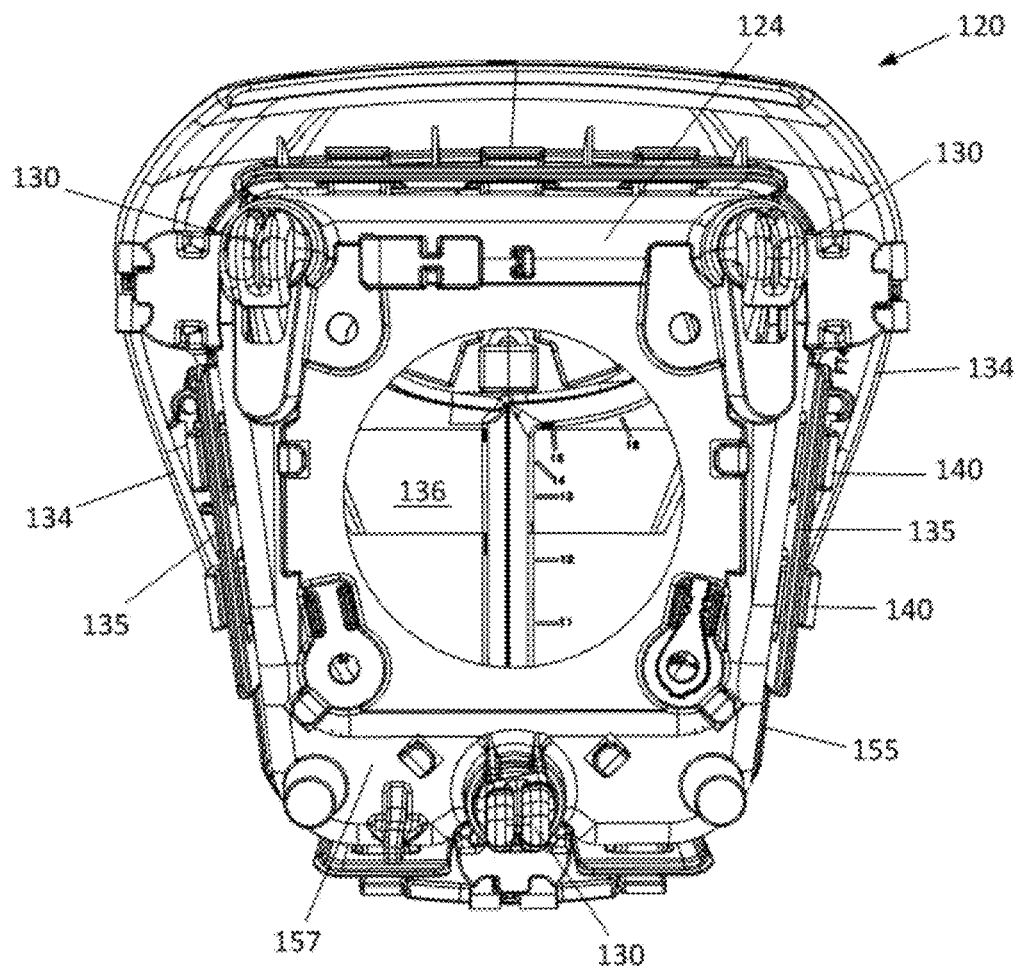
FIG. 3 is a bottom view of the assembled driver air bag module shown in FIG. 2.
Figure 4:
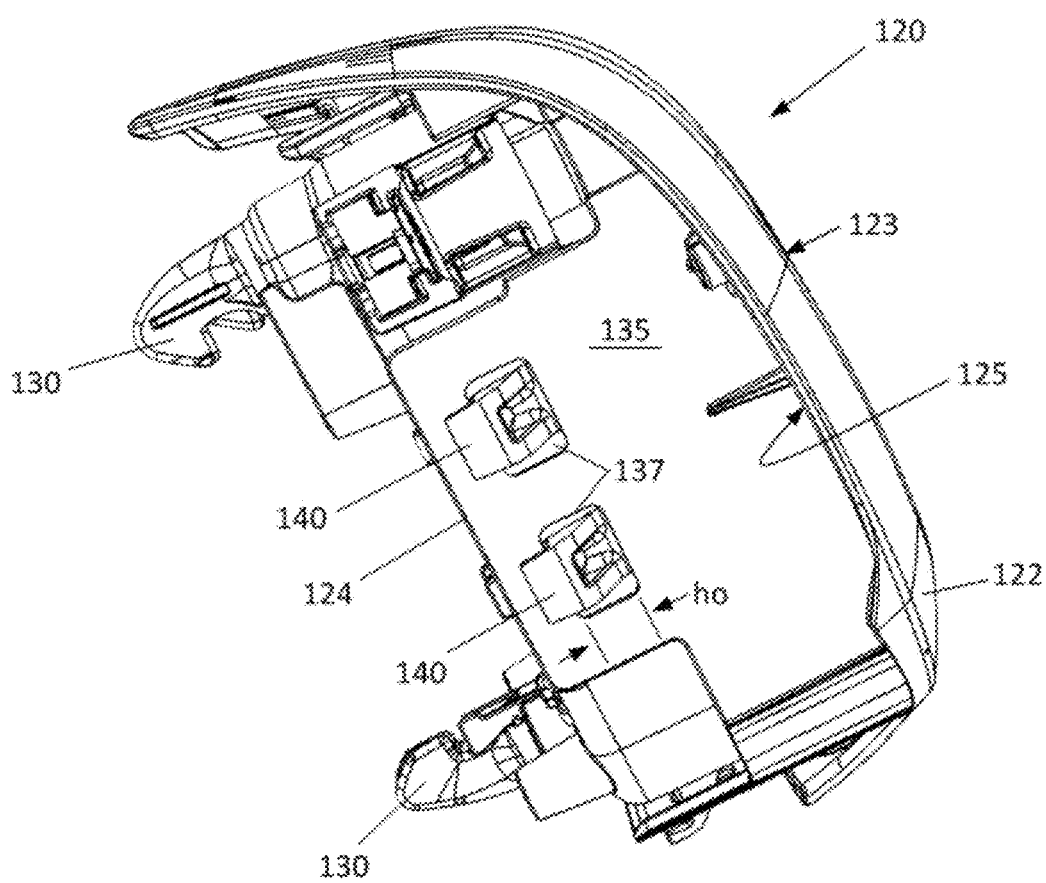
FIG. 4 is a side view of the assembled driver air bag module shown in FIG. 2.

A driver air bag module 120 is operably coupled to the steering hub 114. An exemplary implementation of the driver air bag module 120 is shown in FIGS. 2-4. As shown, the driver air bag module 120 includes a base plate 124 and a cover 122. The base plate 124 is configured for being coupled to the hub 114 and is stationary with respect to the hub 114 upon installation. A driver air bag and inflator 136 are disposed adjacent a central portion of an outer surface of the base plate 124, as shown in FIG. 3. The outer surface of the base plate 124 faces outwardly toward the cover 122, and the inner surface 157 of the base plate 124 faces toward the hub 114, in a direction opposite the outer surface of the base plate 124, as shown in FIGS. 2 and 3.

According to the implementation shown in FIGS. 2 through 4, the base plate 124 is coupled to the hub 114 via one or more retainer clips 130. The retainer clips 130 extend from the inner surface 157 of the base plate 124 and engage corresponding openings defined in the hub 114. For example, in the implementation shown in FIGS. 2 through 4, the driver air bag module 120 includes three retainer clips 130. The retainer clips 130 prevent movement of the base plate 124 relative to the hub 114. In an alternative implementation, the base plate 124 may include one or more retainer snaps that mate with and engage snaps on the hub 114 to couple the driver air bag module 120 to the hub 114. In other implementations, other suitable fastening mechanisms may be used to couple the driver air bag module 120 to the hub 114.

The cover 122 includes an outer surface 123 and an inner surface 125. The outer surface 123 of the cover 122 faces outwardly toward the operator of the vehicle, and the inner surface 125 of the cover 122 faces toward the base plate 124 in a direction opposite the outer surface 123. The inner surface 125 defines a seam in a central portion thereof through which the driver air bag expands when inflated.

One or more side walls 135 extend from the inner surface 125 of the cover 122 toward the base plate 124. The side walls 135 are spaced apart from each other and are adjacent a perimeter 134 of the cover 122 such that the driver air bag and inflator 136 are disposed between the side walls 135 when the cover 122 is coupled to the base plate 124. The side walls 135 define openings 137 therethrough.

The base plate 124 includes one or more side walls that extend from the inner surface 157 or outer surface of the base plate 124 adjacent a perimeter 155 of the base plate 124. One or more tabs 140 extend radially outwardly from the side walls of the base plate 124 and axially downwardly relative to the outer surface of the base plate 124. These tabs 140 extend through the openings 137 in the side walls 135 of the cover 122 to couple the cover 122 to the base plate 124. A height $h_o$ of each opening 137 is selected to allow the respective tab 140 to move axially within the opening 137.

At least one force sensor 202 is coupled to the outer surface of the base plate 124 outside of a footprint of the air bag and inflator 136 disposed on the base plate 124. For example, as shown in FIGS. 11-14, the at least one force sensor 202 may be disposed adjacent a perimeter of the base plate 124.

The force sensor 202 can be any device or structure that can transform force into a signal. The signal can be electrical, electronic (digital or analog), mechanical, or optical. For example, the force sensor 202 may be any sensor that changes at least one electrical property (e.g., resistance) in response to force applied to the cover 122. In various embodiments the force sensors are microelectromechanical systems (MEMS) sensors. In one embodiment, the MEMS sensors are structure-based piezo-resistive sensors.

Figure 5:
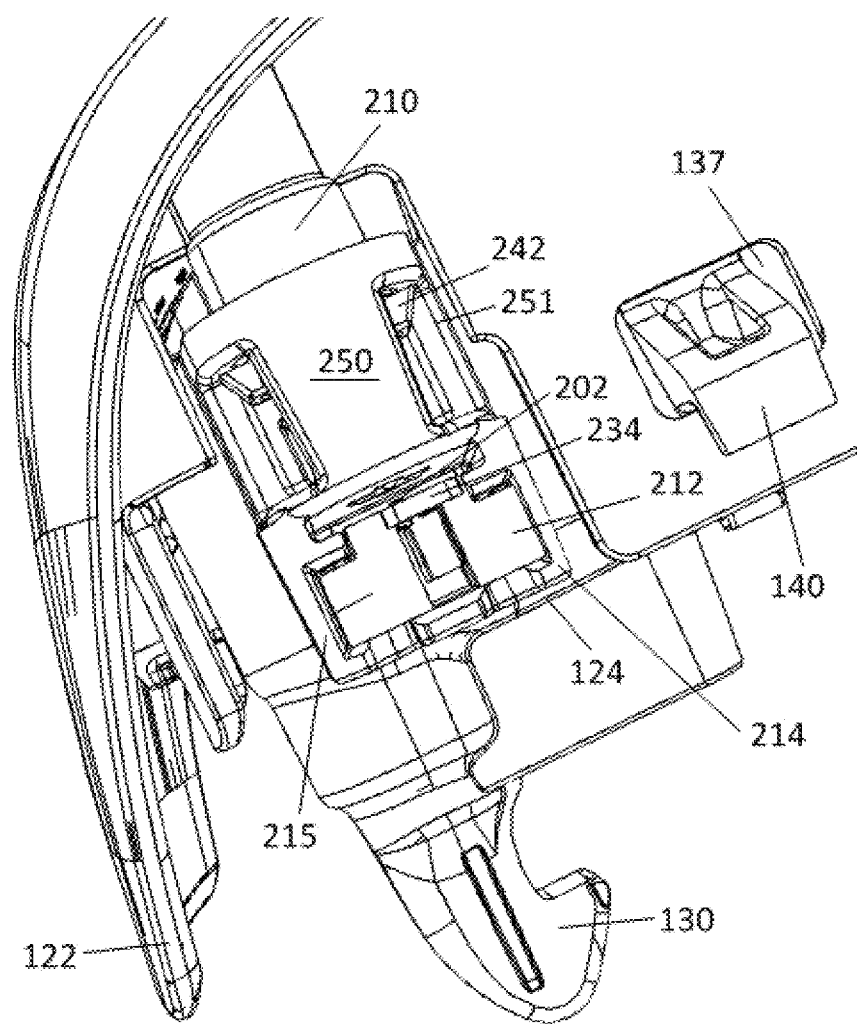
Figure 6:
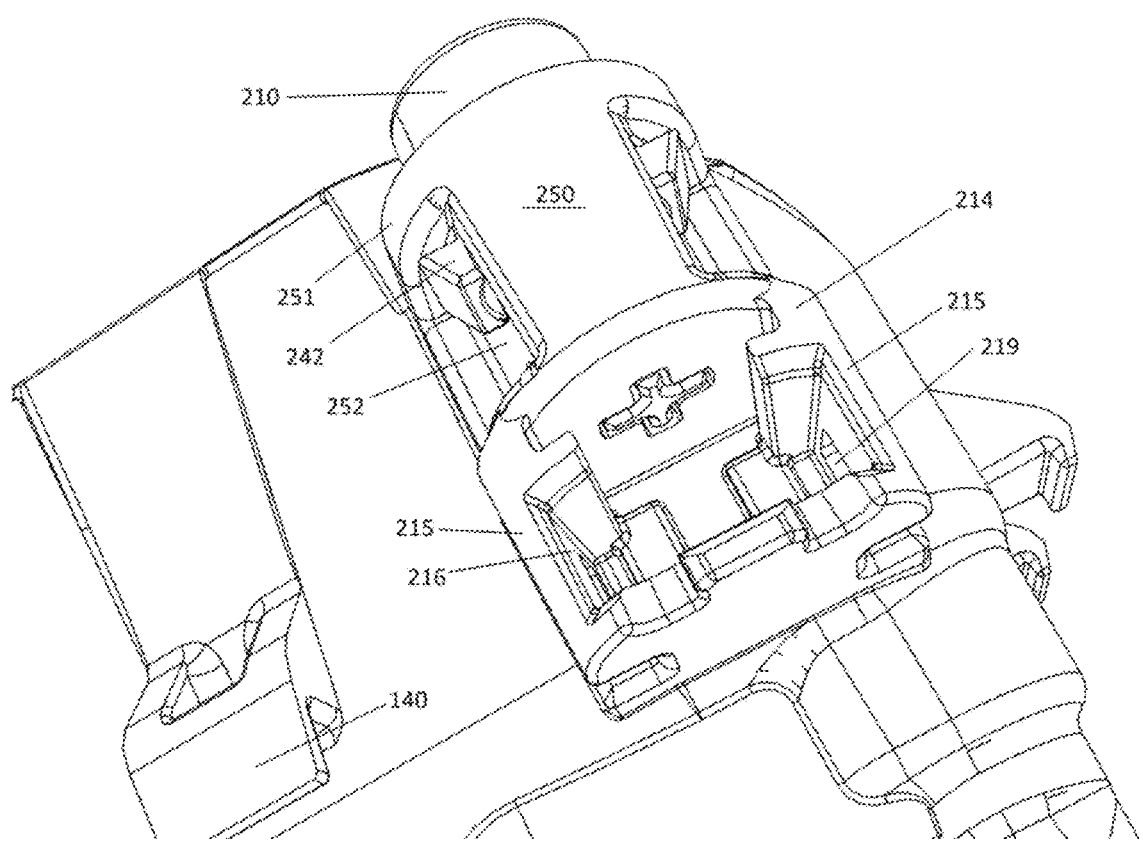
FIG. 6 is a partial bottom perspective view of the assembled driver air bag module shown in FIG. 2.
Figure 7:
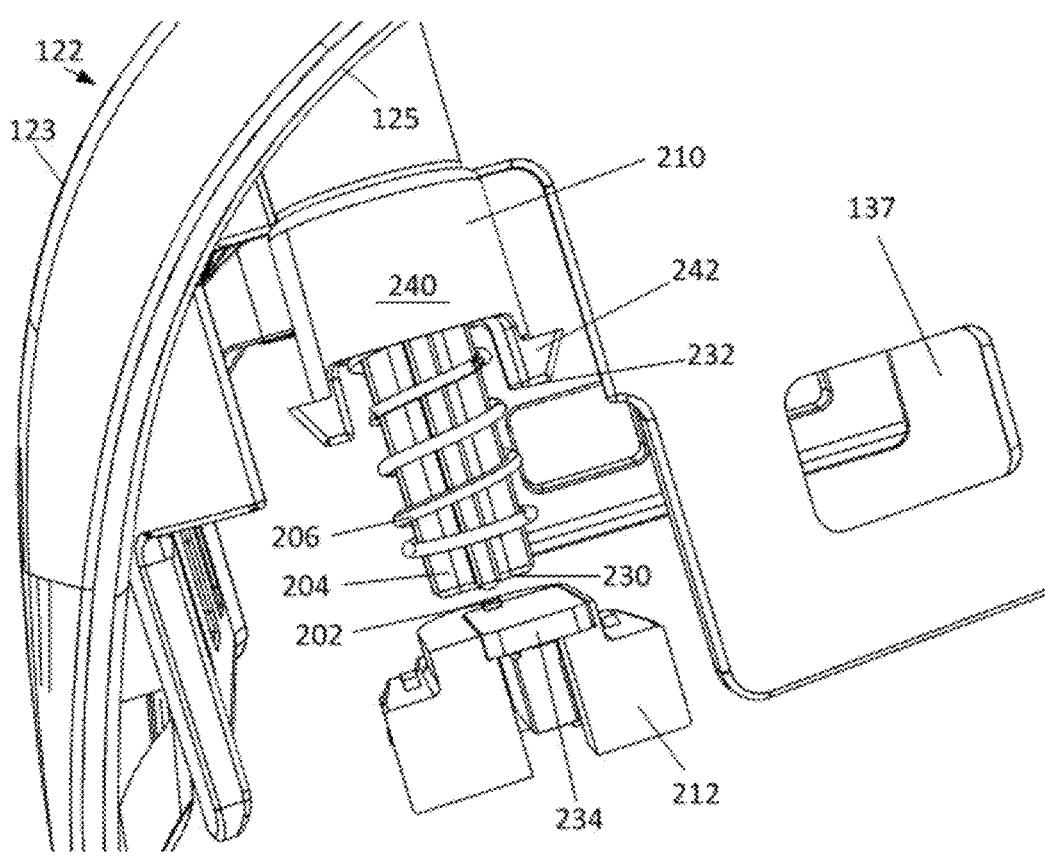
FIG. 7 is a partial side view of the cover portion and one of the force sensors disposed on the base portion of the driver air bag module shown in FIG. 2.
Figure 8:
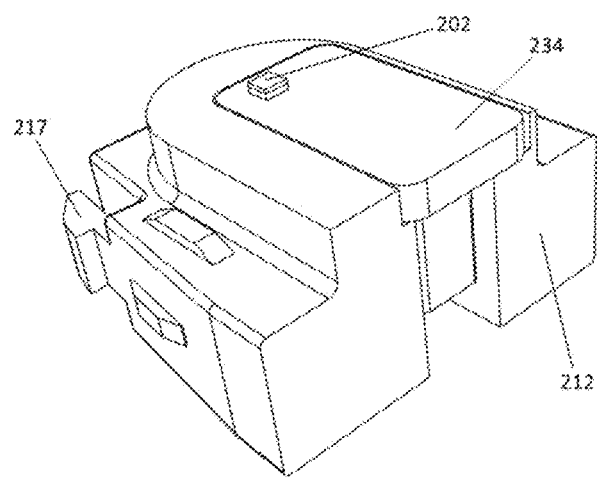
FIG. 8 is a partial side perspective view of one of the force sensors disposed on the base portion of the driver air bag module shown in FIG. 2.
Figure 9:
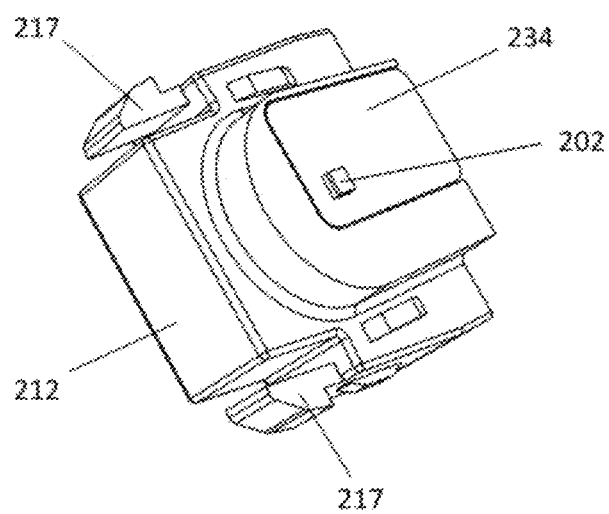
FIG. 9 is a partial top perspective view of one of the force sensors disposed on the base portion of the driver air bag module shown in FIG. 2.

According to some implementations, each force sensor 202 is directly coupled to a printed circuit board (PCB), and the PCB is coupled, directly or indirectly, to the outer surface of the base plate 124. For example, as shown in FIGS. 5, 8, and 9, the PCB 234 is directly coupled to a base 212, and the base 212 is coupled to the base plate 124. In particular, a base holder 214 extends from the outer surface of the base plate 124. The base holder 214 includes at least two spaced apart and opposing side walls 215 that define a channel 216 therebetween. Each side wall 215 of the base holder 214 defines an opening 219 through the side wall 215. The base 212 slides within the channel 216 defined by the opposing side walls 215, and tabs 217 extending from opposite and spaced apart sides of the base 212 engage the openings 219 defined in the side walls 215 to couple the base 212 to the base holder 214.

At least one actuator is disposed axially opposite each force sensor 202. As shown in FIGS. 2, 4, 5, and 7, the actuator includes a plunger 204 that is biased away from the force sensor 202 by a helical compression spring 206. In particular, a proximal end of the plunger 204 is coupled to a cover coupling 210 and/or the inner surface 125 of the cover 122, and a distal end 230 of the plunger 204 extends axially relative to a distal end 232 of the cover coupling 210. A proximal end of the cover coupling 210 is coupled to the inner surface 125 of the cover 122. The compression spring 206 may be coupled at one end to the plunger 204, the inner surface 125 of the cover 122, or to the cover coupling 210, according to various implementations. However, in other implementations, the actuator includes any structure that contacts the one or more force sensors 202 upon axial motion of the cover 122 relative to the base 124. For example, in some alternative implementations, the actuator includes a portion of the cover coupling 210, a portion of the inner surface 125 of the cover 122, and/or a portion of the outer surface of the base 124. The term "axial motion" refers to movement of the cover 122 and the base 124 relative to each other along an axis that extends through the cover 122 and base 124.

To prevent non-axial movement of the plunger 204 when a force is applied to the cover 122, a base coupling 250 is disposed adjacent the base plate 124. The base coupling 250 includes side wall 251 that extends axially away from the base plate 124 adjacent a distal end of the side walls 215 of the base holder 214. The side wall 251 of the base coupling 250 defines axially oriented slots 252. The cover coupling 210 includes side wall 240 that is spaced radially outwardly of the plunger 204. The side wall 240 of the cover coupling 210 defines one or more tabs 242 that extend radially outwardly from the side wall 240 and are spaced apart circumferentially around the side wall 240. The cover coupling 210 has an outer diameter that is less than an inner diameter of the base coupling 250 such that the cover coupling 210 slides within the inner diameter of the base coupling 250 and the tabs 242 engage the axially oriented slots 252 to prevent the cover coupling 210 from being axially removed from the base coupling 250. When a force is applied to the cover 122, the tabs 242 slide axially within the axially oriented slots 252.

Figure 10:
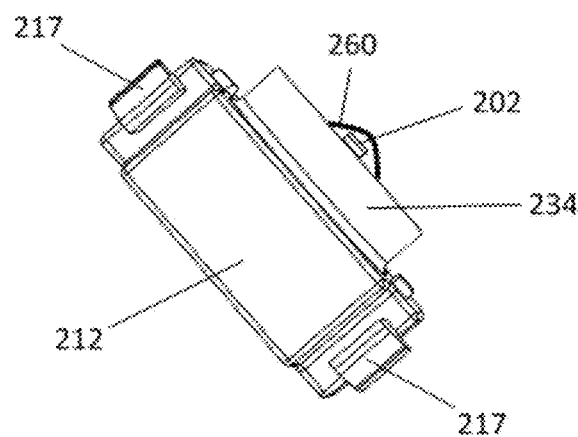
FIG. 10 is a partial rear perspective view of one of the force sensors disposed on the base portion of the driver air bag module shown in FIG. 2.

A compressible material (e.g., an elastomeric material) may be disposed over or adjacent to the force sensor 202. The compressible material may be included to protect the sensor 202 from vibrations and/or water and/or adjust the amount of force or displacement necessary to produce a signal in the force sensor 202. For example, as shown in FIG. 10, an elastomeric material 260, such as a silicone overmolding or cap, may be disposed over the force sensor 202. The amount of force or displacement required to cause the force sensor 202 to generate a force signal is increased based on the properties and thickness of the compressible material. By considering the properties of the compressible material, the type of compressible material and/or the thickness of the material may be selected to "tune" the force sensor 202 and the horn system. Compressible material may also be used to bias the plunger away from the force sensor 202. In addition, in other implementations, other dampening materials and/or mechanisms may be used to bias the actuator away from the force sensor and/or increase the amount of force or displacement necessary to cause the force sensor to generate a signal.

In some implementations, one or more force sensors are oriented in a first plane, and one or more other force sensors are oriented in a second plane. The second plane intersects the first plane an angle greater than 0°. To actuate the force sensors in the first plane, the cover is moved along a first axis that extends through the first plane and the cover. To actuate the force sensors in the second plane, the cover is moved along a second axis that extends through the second plane and the cover. Thus, in such implementations, the cover is moved in two or more directions to actuate sensors disposed in different planes. For example, the first axis may be a z-axis relative to an x-y plane that includes a portion of cover, and the second axis may be one or both of the x or y axes that include the portion of the cover.

In some implementations the system may also include a feedback generator, such as a haptic generator used to generate tactile and/or audible feedback. For example, a tactile and/or audible feedback generator may include a speaker, a coneless coil and magnet assembly, an electro haptic exciter, a rotational vibration motor, an LRA, or other suitable feedback generator. The feedback generator may be disposed anywhere between the base 124 and inner surface 125 of the cover 122 outside of the perimeter of the air bag and inflator 136, according to some implementations. For example, the feedback generator may be coupled to the inner surface of the cover 122 or to the base 124.

In implementations in which the force sensor 202 is a MEMS sensor, the amount of force required to generate a force signal depends on the spring coefficient of the spring 206 and/or any compressible (e.g., elastomeric) material disposed adjacent the force sensor 202. For example, the minimum force required to actuate the horn may be 3 Newtons. Furthermore, the axial distance required to urge the plunger 204 against the force sensor 202 depends on the spacing of the distal end 230 of the plunger 204 relative to the force sensor 202.

Figure 11:
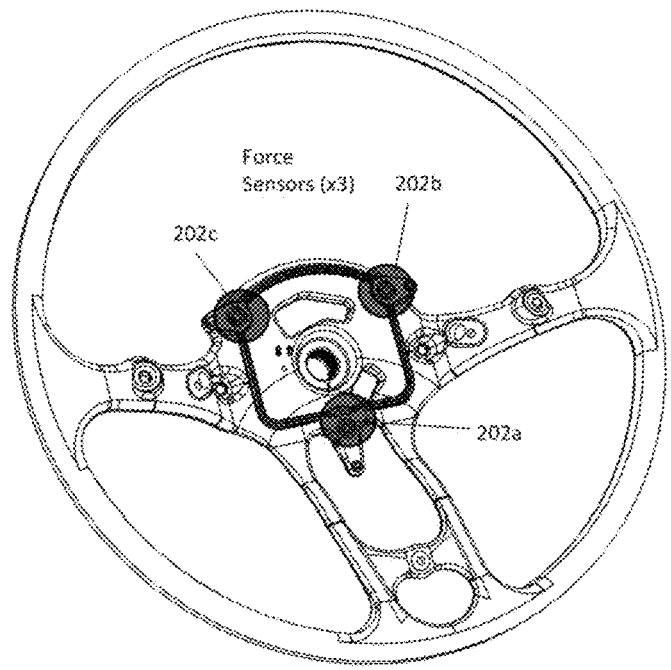
FIG. 11 is a force sensor arrangement according to one implementation.
Figure 12:
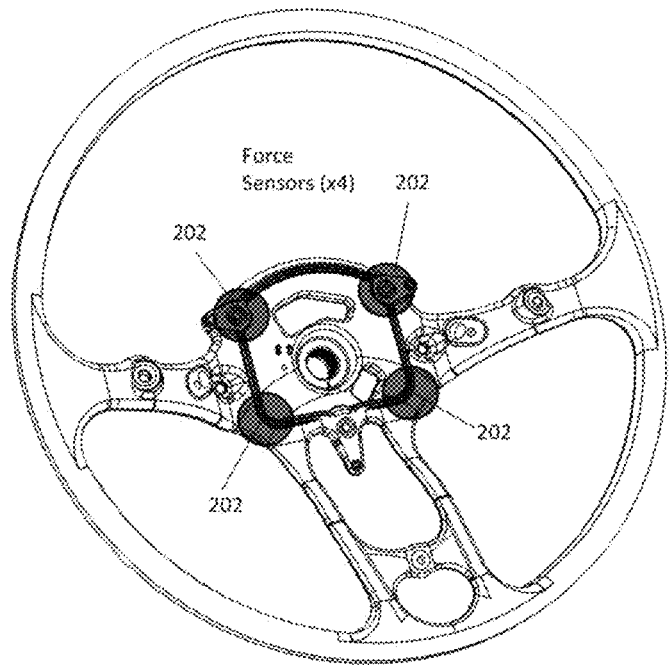
FIG. 12 is a force sensor arrangement according to one implementation.
Figure 13:
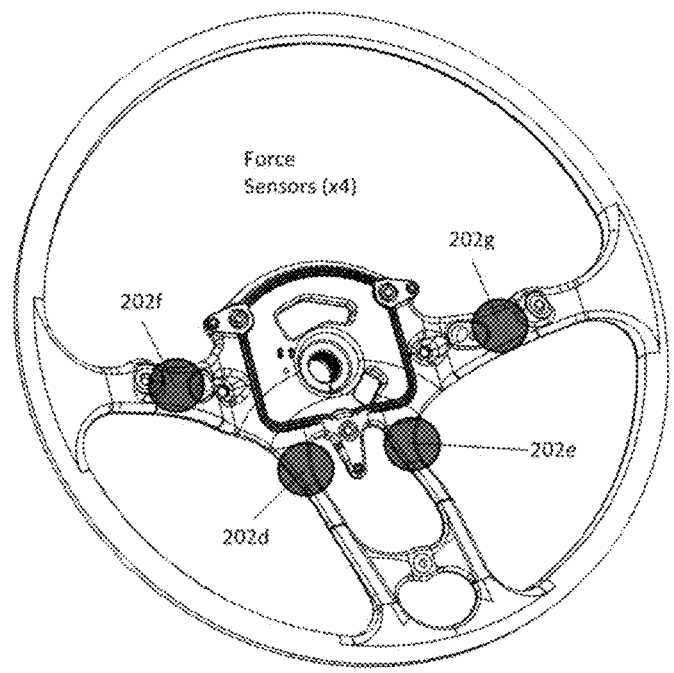
FIG. 13 is a force sensor arrangement according to one implementation.
Figure 14:
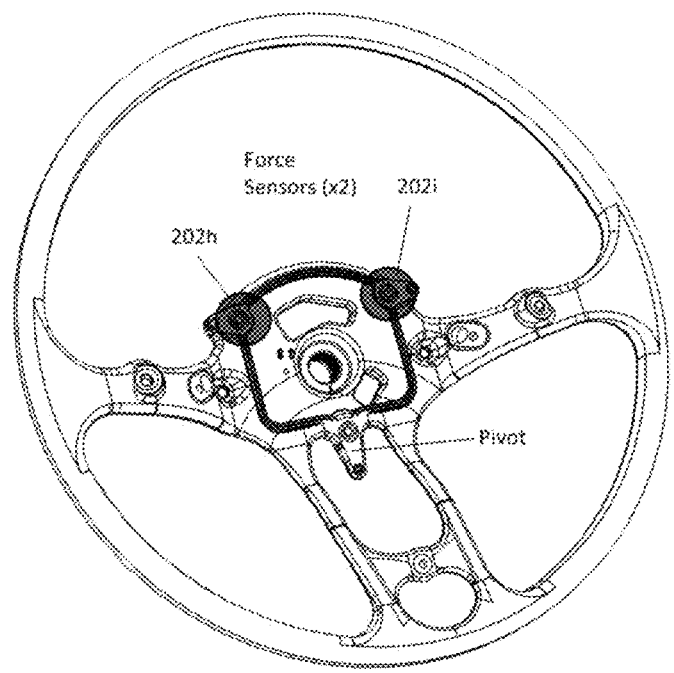
FIG. 14 is a force sensor arrangement according to one implementation.

FIGS. 11 through 14 illustrate exemplary layouts for how the force sensors 202 may be disposed relative to the base plate 124. Corresponding plungers 204 are disposed on the cover 122 axially opposite the force sensors 202. However, in some implementations, an actuator, such as a side wall or an elongated bar may extend from the inner surface 125 of the cover 122 to contact two or more force sensors 202. FIG. 11 illustrates a force sensor arrangement in which one force sensor 202a is disposed adjacent a lower perimeter of the base plate 124 and two force sensors 202b, 202c are disposed adjacent side perimeters of the base plate 124. FIG. 12 illustrates force sensor arrangements in which four force sensors 202 are disposed adjacent corners of the base plate 124. FIG. 14 illustrates a force sensor arrangement in which two force sensors 202h, 202i are disposed adjacent an upper perimeter of the base plate 124, and a lower portion of the cover 122 is pivotably coupled to the base plate 124.

FIG. 13 illustrates a force sensor arrangement in which two force sensors 202d, 202e are disposed adjacent the hub 114, and two force sensors 202f, 202g are disposed adjacent spokes 113 extending between the rim 112 and the hub 114. Corresponding actuators (not shown) extend from the inner surface of the base plate 124 for applying a force to the one or more force sensors 202d, 202e, 202f, 202g in response to force applied to the cover 122. Springs may be disposed about the retainer clips 130 to allow the air bag module 120 to over travel its normal position when the retainer clips 130 are coupled to the hub 114 and to bias the air bag module 120 away from the hub 114 and spokes 113.

The implementations described above in relation to FIGS. 1 through 14 may be used to activate a horn of a horn system of a vehicle. In particular, the force signal generated by each force sensor 202 is communicated to a computer processor, and depending on one or more characteristics and/or force profiles of the force signals received, the processor selects a control message from a plurality of control messages to communicate to the horn system of the vehicle. The horn system receives the control message and actuates the horn based on the control message. In addition, the force signals generated by the force sensors may also be used to select a control message for one or more tactile and/or audible feedback generators disposed within the driver air bag module or elsewhere on the steering interface.

For example, in some implementations, the control message may include an instruction to actuate the horn at a certain sound level, at a particular level or range of levels periodically, for a certain time period, in a particular direction from the vehicle (e.g., front, right side, left side), and/or using a particular sound.

In addition, according to some implementations, the characteristics of the force signal may include a magnitude of the force applied, a position on the cover 122 to which the force is applied, a duration of the force applied, a frequency at which the force is applied, or any combination of these characteristics. The force profile may include, for example, one or more criteria that include one or more of the force characteristics, a change in force magnitude over a lookback period, a frequency with which the force magnitude is detected during a lookback period, or combination thereof.

Figure 15:
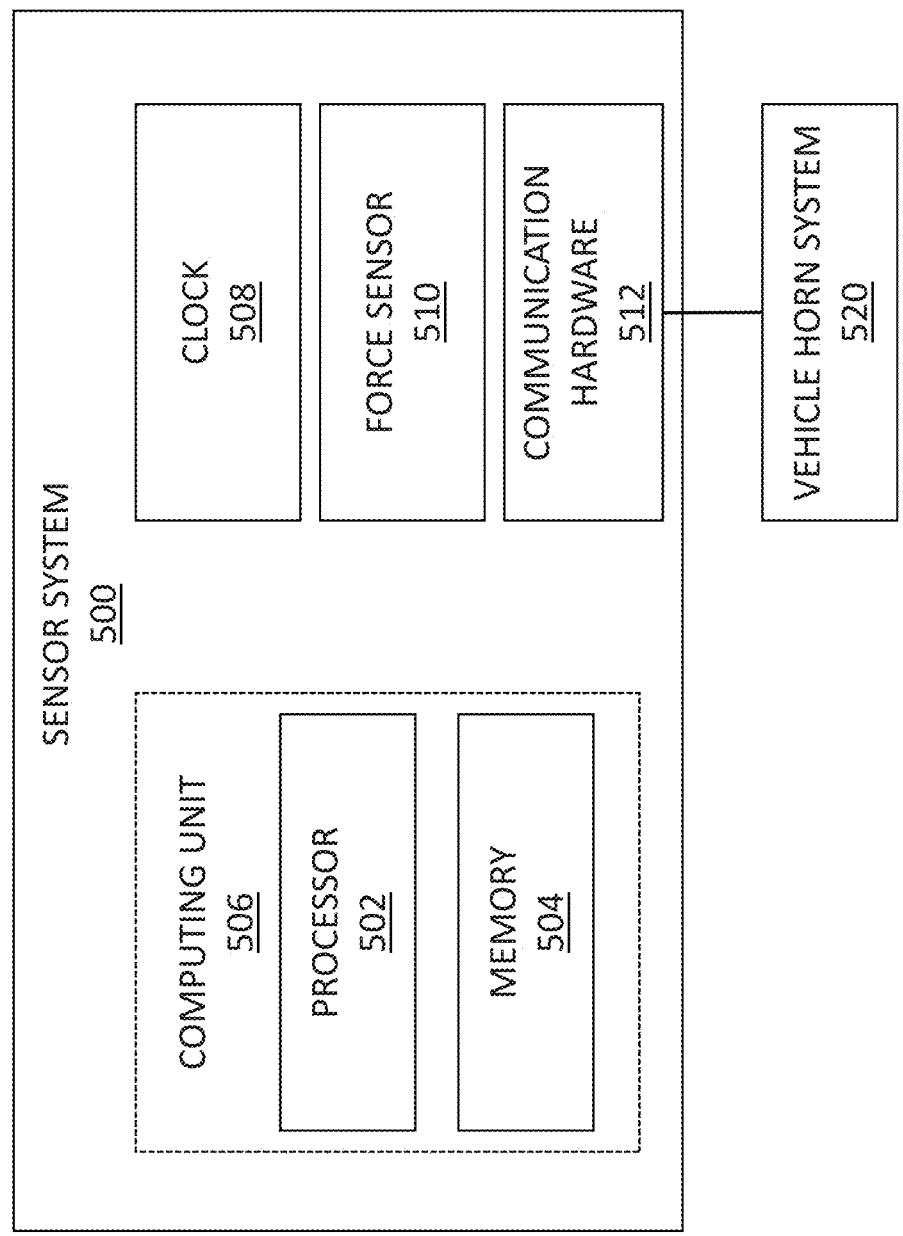
FIG. 15 illustrates a block diagram of a horn system according to an implementation of the invention.

FIG. 15 illustrates a block diagram of a force-based sensor system 500 that receives force signals from the force sensors and communicates control messages to the vehicle horn system 520, according to one implementation. The system 500 may also communicate control messages to one or more tactile and/or audible feedback generators as noted above. The sensor system 500 may be configured for identifying one or more force characteristics and/or force profiles from the force sensors and selecting the control message for the horn system based on the force characteristics and/or force profiles. For example, one or more force characteristics and/or force profiles may be compared with one or more threshold characteristics and/or profiles associated with various control messages. Furthermore, the threshold criteria associated with each control message may be adjusted based on the number and arrangement of the sensors, the usability desired by the vehicle manufacturer or operator, and/or the operating conditions of the vehicle (e.g., vibration of the vehicle and/or the steering wheel, the vibration to be imparted by a tactile and/or audible feedback generator, temperature, etc.).

The sensor system 500 may include a computing unit 506, a system clock 508, one or more force sensors 510 and communication hardware 512. In its most basic form, the computing unit 506 may include a processor 502 and a system memory 504. The processor 502 may be a standard programmable processor that performs arithmetic and logic operations necessary for operation of the sensor system 500.

The processor 502 may be configured to execute program code encoded in tangible, computer-readable media. For example, the processor 502 may execute program code stored in the system memory 504, which may be volatile or non-volatile memory. The system memory 504 is only one example of tangible, computer-readable media. In one aspect, the computing unit 506 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 502, the machine becomes an apparatus for practicing the disclosed subject matter.

In addition, the one or more force sensors 510 may include force sensors 202 described above. Further, the communication hardware 512 interfaces with the force sensors 510 and receives/measures the sensed changes in the at least one electrical property of the force sensors 510. Additionally, the processor 502 may be configured to associate the sensed changes in the at least one electrical property of the force sensor 510 with a time from the system clock 508 and store the sensed changes and corresponding time to the system memory 504. Optionally, the processor 502 may be configured to analyze the stored data and associate measured changes in the at least one electrical property of the force sensor 510 with various control messages for controlling horn functions. The communication hardware 512 may further be configured for communicating the selected control message(s) to the horn system 520.

Figure 16:
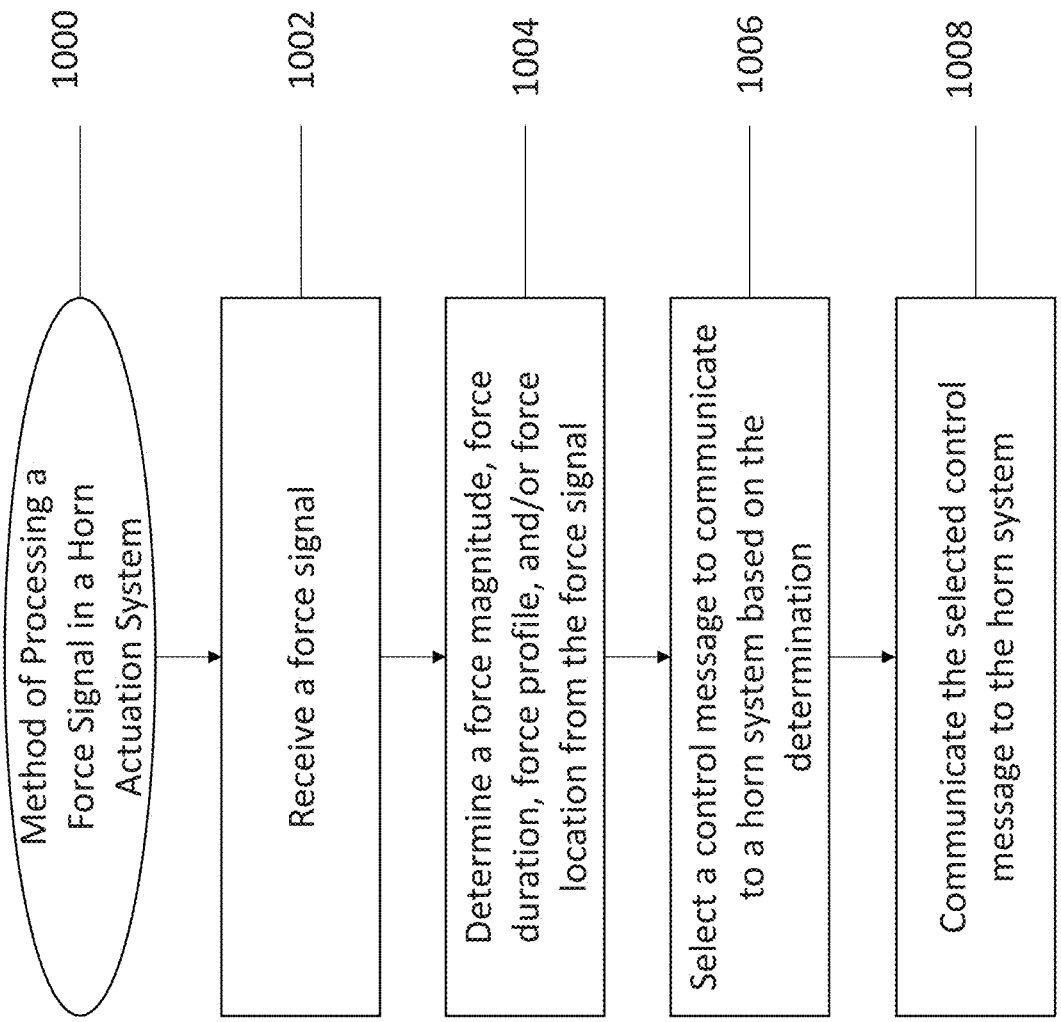
FIG. 16 illustrates a flow chart according to one implementation.

For example, force signals from the force sensors 510 can be transmitted to the processor 502. The processor 502, which is in communication with memory 504, executes computer-readable instructions stored on the memory 504. FIG. 16 illustrates a flow chart according to various implementations illustrating steps taken by the processor 502 in response to the instructions. In step 1002, the processor receives a force signal from the one or more force sensors 510, such as force sensors 202. In step 1004, the processor determines a force magnitude, force duration, force profile, and/or force location from the force signal. For example, in some implementations, the force location is along a width 304 and a length 306 of the cover 122 as shown in FIG. 1. In step 1006, the processor selects a control message to communicate to the horn system based on the determination. In step 1008, the processor communicates the selected control message to the horn system.

The force signal can be transmitted from the force sensors 202 to the processor 502 via a wired connection (including fiber optics), wirelessly (RF using protocols such as Bluetooth, WiFi (IEEE 802.11n), etc.), or combinations thereof. For example, by having the location of these force sensors 202 programmed into its memory 504, the processor 502 can determine whether a force is being applied to a particular section of the cover 122 (e.g., an upper left section, an upper right section, a lower left section, a lower right section, a center section). By determining the magnitude of the force being applied to the force sensors 202, the processor 502 can be programmed via instructions from the memory 504 to further refine the location of the force and to select a control message from a plurality of control messages for the horn system 520 based on the location of the force on the cover 122, the magnitude of the force applied to the cover 122, the time the force is applied to the cover 122, the rate of the change of the magnitude of the applied force to the cover 122 (e.g., pushing a thumb quickly into a peripheral portion of the cover 122 results in one action being taken while slowly pushing the thumb into the peripheral portion of the cover 122 may result in a different action being taken), and/or changes in the magnitude of the force applied to the cover 122. The location of the applied force may include one dimension (e.g., the X- or Y-direction) or two dimensions (e.g., the X- and Y-directions), as well of as the magnitude of the applied force (e.g., force in the Z-direction).

For example, the processor 502 may be configured for selecting a control message for the horn system from a plurality of control messages in response to detecting a force magnitude from one or more force sensors 202 that exceeds a threshold force magnitude. For example, in the arrangement shown in FIG. 11, the threshold force magnitude for each sensor may be set to 3 Newtons. If the force on any one of the sensors exceeds 3 Newtons, a first control message may be selected. If the force on two or more of the sensors together exceeds 6 Newtons, a second control message may be selected. And, if the force on all three sensors together exceeds 9 Newtons, a third control message may be selected. Furthermore, the processor 502 may be configured to balance the threshold force magnitude required across the outer surface 123 of the cover 122. In addition, the force threshold may be set depending on the location of the force on the cover 122. For example, in some implementations, the force threshold may be set to the same value across the cover, and in other implementations, the force threshold may different for one or more areas of the cover.

In addition, each control message may be associated with a certain force location, a magnitude (or force magnitude range) associated with each location, a duration of force applied at each location, and/or force profile. For example, the first control message may be selected in response to detecting a force applied in the upper left quadrant of the cover that exceeds a force magnitude threshold for a given duration associated with upper left quadrant, the second control message may be associated with a force applied in the upper right quadrant of the cover that exceeds a force magnitude threshold for a given duration associated with the upper right quadrant of the cover, and a third control message may be associated with a force applied in the lower right or left quadrant or centrally to the outer surface 123 of the cover 122 that exceeds a force magnitude threshold for a given duration associated with the lower right or left quadrant or centrally to the outer surface.

The first, second, and third control messages may be the same or different. In addition, the sound level associated with the control message may be proportional to the force magnitude to provide an analog response to the force received.

Furthermore, in some implementations, the system 500 is configured for detecting a vibration of the cover 122 and offsetting the criteria for each control message to account for this vibration. This offset can prevent accidental horn operation when the vehicle encounters bumpy road or off-road conditions. For example, the processor 502 may receive a frequency of the force signal from one or more force sensors 202 during a lookback period, compare the received frequency with a threshold frequency that corresponds to vibration of the vehicle, and in response to the received frequency being higher than the threshold frequency, generate a second force magnitude threshold by adding a force magnitude associated with the force signal received during the lookback period to a first force magnitude threshold. The control message is then selected in response to the force magnitude received after the look back period being greater than the second force magnitude threshold. The first force magnitude may also be associated with a particular force location, according to certain implementations. In addition, monitoring the vibratory forces on the driver air bag module 120 through the system 500 allows for the effectiveness of a driver air bag module dampening system and/or steering wheel vibration warning system to be monitored, allows for extreme shock responses, such as due to vehicle impact with another object, to be detected by the system 500, and allows for the effectiveness of the tactile feedback system to be monitored (e.g., to confirm a tactile feedback signal is generated in response to a force input).

In addition, the processor 502 may be configured for selecting a control message for the tactile and/or audible feedback generator based on the force signals received.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

The invention claimed is:

1. A vehicle horn actuation system comprising:
a base plate having an inner surface and an outer surface, wherein the base plate is configured for being coupled to a steering hub of the vehicle;
a cover, wherein the cover has outer surface and an inner surface, the outer surface of the cover faces outwardly toward an operator of the vehicle, and the inner surface of the cover faces toward the base plate in a direction opposite the outer surface,
wherein the outer surface of the base plate faces outwardly toward the cover, and the inner surface of the base plate faces toward the hub, in a direction opposite the outer surface of the base plate, and wherein the cover and/or the base plate are axially translatable relative to one another;
one or more side walls that extend from the inner surface of the cover toward the base plate, wherein the side walls are spaced apart from each other and are adjacent a perimeter of the cover, the one or more side walls define openings therethrough;
one or more side walls that extend from the inner surface or outer surface of the base plate adjacent a perimeter of the base plate, the one or more side walls of the base plate having one or more tabs that extend radially outwardly from the one or more side walls of the base plate and axially downwardly relative to the outer surface of the base plate such that these one or more tabs extend through the openings in the one or more side walls of the cover and such that the one or more walls of the base plate are radially inside the one or more walls of the cover wherein each opening defined by the one or more side walls of the cover has a height to allow the respective base plate tab to move axially within the opening;
a driver air bag module comprising a driver air bag and an inflator, wherein the driver air bag and the inflator are disposed between the one or more side walls of the base plate and the one or more side walls of the base plate are disposed between the one or more side walls of the cover;
at least one force sensor disposed outside the one or more walls of the cover;
an actuator disposed on one of the base plate or the cover, the actuator and the force sensor being axially aligned such that the actuator moves axially toward the force sensor in response to an axial force being applied to the base plate or the cover; and
a processor in communication with a memory, wherein the processor executes computer-readable instructions stored on the memory, said instructions cause the processor to:
receive a force signal from the force sensor; and
select a control message to communicate to a horn system, wherein the control message is selected from a plurality of control messages depending upon the force signal.

2. The horn actuation system of claim 1, wherein the instructions further cause the processor to determine a corresponding force magnitude associated with the force signal.

3. The horn actuation system of claim 2, wherein the processor selects the control message in response to the detected force magnitude exceeding a threshold force magnitude.

4. The horn actuation system of claim 1, wherein the force sensor is a microelectromechanical system (MEMS) sensor.

5. The horn actuation system of claim 4, wherein the MEMS sensor is a structure-based piezo-resistive sensor.

6. The horn actuation system of claim 1, wherein the actuator extends from the inner surface of the cover.

7. The horn actuation system of claim 1, wherein the force sensor is disposed on a printed circuit board, and the printed circuit board is disposed adjacent the outer surface of the base plate.

8. The horn actuation system of claim 1, wherein the force sensor comprises at least two force sensors disposed in a spaced apart relationship and at least one actuator axially aligned with the force sensors, and the instructions stored in the memory cause the processor to identify a location on the first portion of the driver air bag module to which force is applied based on the force signals received from the force sensors.

9. The horn actuation system of claim 2, wherein the control message selected depends upon the identified location and/or a force magnitude at one or more of the force sensors.

10. The horn actuation system of claim 9, wherein the control message comprises a first control message associated with a first location and second control message associated with a second location.

11. The horn actuation system of claim 10, wherein the first control message is selected in response to the force magnitude at the first location being greater than a first force threshold associated with the first location, and the second control message is selected in response to the force magnitude at the second location being greater than a second force threshold associated with the second location.

12. The horn actuation system of claim 11, wherein the first control message is selected in response to the force magnitude at the first location being greater than the first force threshold associated with the first location for a first minimum duration, and the second control message is selected in response to the force magnitude at the second location being greater than the second force threshold associated with the second location for a second minimum duration.

13. The horn actuation system of claim 1, wherein the selected control message depends on a duration and/or a force magnitude of the force signal.

14. The horn actuation system of claim 1, further comprising a dampening material disposed between the force sensor and the actuator.

15. The horn actuation system of claim 14, wherein the dampening material comprises a compressible material.

16. The horn actuation system of claim 1, wherein the plurality of control messages comprise a first control message and a second control message, wherein the first control message is selected in response to a force magnitude of the force signal being within a first threshold force range and a second control message is selected in response to the force magnitude being within a second threshold force range, the first control message being different than the second control message.

17. The horn actuation system of claim 16, wherein the first control message comprises a first sound for the horn, and the second control message comprises a second sound for the horn, the first sound being different than the second sound.

18. The horn actuation system of claim 16, wherein the first control message comprises a first duration for the horn sound and the second control message comprises a second duration for the horn sound, the first duration being different than the second duration.

19. The vehicle horn actuation system of claim 1, wherein the control message comprises a horn activation message.

20. The vehicle horn actuation system of claim 19, wherein the horn activation message comprises a sound and a duration for the sound.

\* \* \* \* \*